United States Patent [19]

Kosmanski

[11] 4,332,302
[45] Jun. 1, 1982

[54] VEHICLE VACUUM SUPPLY SYSTEM

[75] Inventor: Thomas J. Kosmanski, Davison, Mich.

[73] Assignee: General Motors Corporation, Detroit, Mich.

[21] Appl. No.: 172,707

[22] Filed: Jul. 28, 1980

[51] Int. Cl.³ .............................................. B60T 13/48
[52] U.S. Cl. .................................... 180/54 R; 60/397; 60/412; 60/484; 138/44
[58] Field of Search .................... 180/54 R; 417/302; 418/15; 138/40, 44, 45; 91/369 R, 369 A, 369 B, 376 R; 60/397, 407, 412, 484

[56] References Cited

U.S. PATENT DOCUMENTS

| | | | |
|---|---|---|---|
| 2,366,382 | 1/1945 | Burton et al. | 91/369 R |
| 2,899,979 | 8/1959 | Dahl et al. | 138/45 |
| 3,006,535 | 10/1961 | White | 417/279 |
| 3,799,132 | 3/1974 | MacGuire | 138/45 X |
| 4,024,713 | 5/1977 | Ueda | 91/369 R X |
| 4,159,013 | 6/1979 | Sawada et al. | 123/117 A |

Primary Examiner—Joseph F. Peters, Jr.
Assistant Examiner—Michael Mar
Attorney, Agent, or Firm—Robert J. Outland

[57] ABSTRACT

A vacuum supply system for automotive vehicles having vacuum powered accessories and driven by an engine with an air intake system in which vacuum is developed that may be inadequate to operate the accessories under some conditions. A vacuum pump, which may be engine driven, is connected between the engine and the accessories to supplement the operating vacuum. Flow limiting orifices in a junction connecting with secondary accessories provide for continued operation of a primary accessory such as a vacuum brake booster in spite of the disconnection of a vacuum hose or other massive air leak in one of the secondary accessory lines.

6 Claims, 4 Drawing Figures

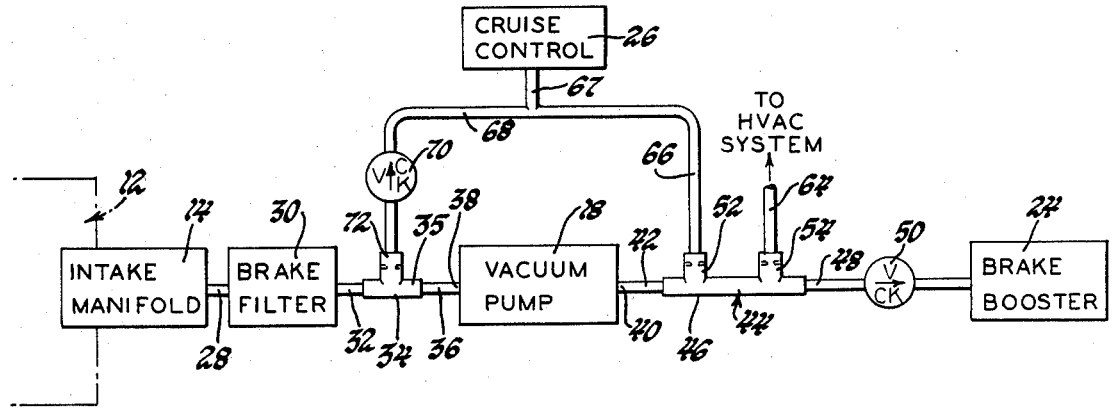

VEHICLE VACUUM SUPPLY SYSTEM

TECHNICAL FIELD

This invention relates to vehicle vacuum supply systems for vacuum powered accessories such as vacuum assisted brakes, heating and ventilating system controls, vehicle speed controls and others. In particular the invention relates to pump supplemented engine intake vacuum supply systems and means to protect operation of a primary accessory against a hose disconnection or massive leak in lines to a secondary accessory.

BACKGROUND

It is known in the art relating to vehicle vacuum supply systems to utilize the intake system of an internal combustion engine as a source of vacuum for driving various accessory devices; such as, for example, vacuum brake boosters, heating and ventilating system motors, speed or cruise control devices and various other accessory devices and motors. It is also known that the intake vacuum of throttle controlled spark ignition engines, for example, varies significantly under differing operating conditions from a relatively high degree of vacuum under highly throttled, low speed and load operation to relatively small vacuums under wide open throttle conditions of heavy engine load.

In the past, when the use of vacuum actuated windshield wipers was common, the problem of the wipers stopping during vehicle acceleration due to reduced engine vacuum was overcome in some cases by providing a booster vacuum pump in series with the intake manifold vacuum supply connection. Such a pump was sometimes provided as an adjunct to the engine-driven fuel pump to provide sufficient vacuum supply for maintaining operation of the wipers under conditions of reduced engine vacuum.

In recent years, vacuum-powered windshield wipers have generally been replaced by electric motor-driven devices, while vacuum power has been utilized increasingly for the operation of vacuum assisted power brakes as well as various other accessory devices. In such systems, the problem of temporarily reduced engine vacuum, such as during acceleration, has been taken care of by provision of a large storage reservoir for the vacuum brake booster so that the use of supplemental or booster vacuum pumps has essentially disappeared.

Today, demands for ever increasing vehicle fuel economy are leading to the use of smaller sized engines and lower engine cruising speeds resulting in engine operation during highway cruising at throttle positions much closer to the high economy, wide open throttle condition than was previously the case. As a result, the level of vacuum produced by a vehicle engine under highway cruise conditions may now be inadequate to drive certain of the vehicle's vacuum powered accessories. Further, provision of an extensive network of limited access highways throughout the United States has made it possible to drive a vehicle under steady state cruising conditions for several hours at a time, yielding the possibility that even a substantial vacuum storage volume may not be sufficient to maintain adequate vacuum for operating certain vehicle accessories during the period in which constant operation at normal cruising speed may be possible.

SUMMARY OF THE INVENTION

The present invention provides a novel vehicle vacuum supply system which combines the use of an engine intake vacuum supply with a series connected supplemental vacuum pump to supply vacuum under various operating conditions to a plurality of vacuum powered accessories, including a primary accessory such as a vacuum brake booster. A feature of the invention is that the series connected pump and engine intake vacuum system are connected by a primary conduit to the primary accessory and by secondary conduits to the secondary accessories. Another feature is that restriction means, such as flow limiting orifices, are provided in the connections to the secondary conduits to limit the flow of air into the system should a conduit or hose to a secondary accessory be disconnected or subject to a massive air leak.

Such flow restrictors or orifices are sized in relation to the capacity of the vacuum supply system to assure adequate vacuum for operation of the primary accessory in spite of such a hose disconnection or massive leakage in the conduit or line to a secondary accessory. Preferably, orificed flow restrictors are integrated within a tee or other device which also acts as a conduit junction and hose attachment device for connecting hoses to the various accessories and to the vacuum pump.

These and other features and advantages of the invention will be more fully understood from the following description of the preferred embodiment taken together with the accompanying drawing.

BRIEF DESCRIPTION OF THE DRAWING

In the drawing:

FIG. 1 is a pictorial view showing the installation in a vehicle of a vacuum supply system in accordance with the invention;

FIG. 2 is a schematic view relating the elements of the system of FIG. 1;

FIG. 3 is an enlarged side view of a hose connection junction tee having secondary conduit restricting orifices in accordance with the invention and FIG. 4 is an end view of the tee shown in FIG. 3.

BEST MODE DISCLOSURE

Referring now to the drawing in detail, numeral 10 generally indicates an automotive vehicle driven by an internal combustion engine 12. The engine has an air intake system including an intake manifold 14 supporting a centrally located fuel mixture preparation device, such as a carburetor 16. Within the carburetor is provided the usual throttle, not shown, for controlling the volume of air/fuel mixture supplied to the engine via the induction system. Engine 12 also supports on suitable brackets a vacuum pump 18 which is driven by the engine through a pump-mounted pulley 20 turned by a driving belt 22 which connects with a pulley, not shown, driven to the engine crankshaft in conventional manner.

Vehicle 10 is also provided with a number of vacuum powered accessories, including a vacuum brake booster 24, which is conventionally mounted on the engine compartment rear wall 25 of the vehicle body. In addition, the vehicle is provided with a driver-actuated vacuum powered vehicle speed or cruise control 26 and a heating, ventilating and air conditioning (HVAC)

system, not shown, having vacuum actuated damper control motors in accordance with current practice.

In accordance with the invention, certain of the previously noted elements are combined into a vehicle vacuum supply system for operating the various vacuum powered accessories. For this purpose, a primary conduit made up of a number of elements to be subsequently described, is provided to connect the intake manifold 14, or the engine induction system below the carburetor throttle, with the brake booster 24 for the purpose of supplying vacuum thereto.

As shown in the drawing, the primary conduit includes a vacuum tube 28 that connects the intake manifold at the base of the carburetor with a brake filter 30 provided to filter air exhausted from the vacuum system to the engine intake. The brake filter is in turn connected through a short hose 32 with a tee 34, a primary leg 35 of which connects through a second hose 36 with the outlet 38 of the vacuum pump 18. On the other side of the vacuum pump, the primary conduit continues with the connection of the pump inlet 40 via a hose 42 with another tee 44 having a primary leg 46 that connects through a hose 48 and check valve 50 with the brake booster 24.

As is best shown in FIGS. 3 and 4, tee 44 also includes a pair of spaced secondary legs 52, 54 defining secondary passages 56 connecting with the main or primary passage 58 through restrictive orifices 60 provided in walls at the junction of the primary and secondary passages. The ends of the primary and secondary legs are preferably provided with raised retainers 62 for aiding retention thereon of the various hoses connected to the tee. Preferably the tee is made of molded or machined plastic such as a nylon or the like, although any suitable material may be used.

Secondary leg 54 of the tee 44 is connected through a hose 64 with the HVAC system, not shown, for the purpose of supplying operating vacuum thereto. In like manner, secondary leg 52 of the tee 44 is connected through hoses 66 and 67 with the control portion, not shown, of the cruise control 26 for the purpose of supplying actuating vacuum thereto. A secondary connection hose 68 connects the cruise control through a check valve 70 with a secondary orificed leg 72 of the tee 34 on the outlet side of the vacuum pump.

If desired, other vacuum connections could be made from suitable locations of the primary conduit to other auxiliary vacuum powered accessory devices, preferably using tees having suitable restrictive orifices such as are found in the secondary legs of the previously mentioned tees 34 and 44.

In operation, the engine intake system draws in air under varying vacuums or negative pressures, causing varying degrees of vacuum to be provided via the primary and secondary conduits to the brake booster, the primary accessory, and the secondary vacuum powered accessories including the cruise control and HVAC systems. Vacuum provided to these devices is supplemented as required by operation of the engine driven vacuum pump 18 which draws air from its inlet side 40 and exhausts at its outlet 38 for delivery to the engine intake manifold. Thus adequate vacuum is provided for operation of the connected accessories even during periods of engine operation at or near full throttle.

Temporary deficiencies in vacuum in this system, should they occur, would not be detrimental to the operation of the vacuum powered brake booster since it is conventionally supplied with an enlarged storage tank and the loss of vacuum from this tank to the system or other accessories is prevented by the check valve 50. Provision of the vacuum pump, however, assures that adequate vacuum will be provided during extended operation of the vehicle under nearly wide open throttle cruise conditions when the manifold vacuum may be inadequate for actuating the various accessories.

The secondary accessories, such as the cruise control and HVAC systems, are connected to the primary conduit of the vacuum system on the inlet side of the vacuum pump. For control reasons not pertinent to the present invention, the cruise control may also be connected as shown to the primary conduit on the outlet side of the pump. The check valve 70 is provided to prevent air from bypassing the vacuum pump and causing a loss of vacuum from the system through this connection.

The possibility exists, however, that during operation, one of the hoses connecting a secondary accessory with the primary conduit through the tees 34 or 44 may become detached or ruptured, causing a massive influx of air into the vacuum system and interfering with the supply of vacuum to the associated secondary accessory. Under such a circumstance, operation of the particular secondary vacuum powered accessory involved will, of course, be impeded. However, the orifices 60 provided in the secondary legs of the tees 44 and 34 are sized sufficiently small to protect the primary conduit system against an excessive influx of air and resultant loss of vacuum from the primary conduit and its connected vacuum brake booster. Thus, in spite of the failure or disconnection of a secondary vacuum hose, the vacuum system will maintain an adequate supply of vacuum for operating the brake booster as a preferred or primary vacuum powered accessory.

It should be apparent that the advantages of the described system in accordance with the invention may be applied to any one or more primary accessories which it is desired to keep in operation regardless of the failure or disconnection of conduit means connected with one or more secondary accessories, the operation of which is of lesser importance to the operation of the vehicle. Thus, while the invention has been described by reference to a specific embodiment, it should be understood that numerous changes could be made without departing from the spirit or scope of the inventive concepts described. Accordingly, it is intended that the invention not be limited solely to the features of the described embodiment, but that it have the full scope permitted by the language of the following claims.

The embodiments of the invention in which an exclusive property or privilege is claimed are defined as follows:

1. A vacuum supply system for a vehicle having a plurality of vacuum powered accessories including a primary accessory, said system comprising
    an engine having an air intake system in which vacuum is developed that may be inadequate for operating such vacuum powered accessories under at least some engine operating conditions,
    a primary conduit communicating the primary accessory with the engine intake to provide some operating vacuum,
    a vacuum pump connected in the primary conduit between the primary accessory and engine intake to supplement the operating vacuum provided, at least one secondary conduit connecting an additional accessory to the primary conduit at a junction, and flow restriction means in the secondary conduit at the junction and operative to limit air flow through the secondary conduit to a volume sufficiently less than the capacity of the vacuum supply system to assure the provision of vacuum in the primary conduit for operating the primary accessory even in the event the secondary conduit is opened to atmosphere.

2. A vacuum supply system for a vehicle having a plurality of vacuum powered accessories including a vacuum brake booster, said system comprising an engine having an air intake system in which vacuum is developed that is inadequate for operating such vacuum powered accessories under at least some engine operating conditions, a primary conduit communicating the brake booster with the engine intake to provide some operating vacuum, a vacuum pump connected in the primary conduit between the brake booster and engine intake to supplement the operating vacuum provided, at least one secondary conduit connecting an additional accessory to the primary conduit at a junction between the pump and the brake booster, and flow restriction means in the secondary conduit at the junction and operative to limit air flow through the secondary conduit to a volume sufficiently less than the capacity of the vacuum supply system to assure the provision of adequate vacuum in the primary conduit for operating the brake booster even in the event the secondary conduit is opened to atmosphere.

3. The system of claim 2 wherein said junction comprises a unitary tee having separate legs defining portions of the primary and secondary conduits and means for connecting said tee with other means defining portions of said conduits, said flow restriction means comprising an orificed wall in a secondary conduit defining portion of said tee.

4. A vacuum supply system for a vehicle having a plurality of vacuum powered accessories including a primary accessory, said system comprising a device having an air intake system in which vacuum is developed, a primary conduit communicating the primary accessory with the device intake to provide operating vacuum, at least one secondary conduit connecting an additional accessory to the primary conduit at a junction, and flow restriction means in the secondary conduit at the junction and operative to limit air flow through the secondary conduit to a volume sufficiently less than the capacity of the vacuum supply system to assure the provision of vacuum in the primary conduit for operating the primary accessory even in the event the secondary conduit is opened to atmosphere.

5. The system of claim 4 wherein said device is a vacuum pump.

6. The system of claim 4 wherein said device is an internal combustion engine connected to drive said vehicle.

* * * * *